United States Patent
Buettner et al.

(10) Patent No.: US 11,981,092 B2
(45) Date of Patent: May 14, 2024

(54) METHOD AND SYSTEM FOR PRODUCING A FIBER PREFORM

(71) Applicant: ZF Friedrichshafen AG, Friedrichshafen (DE)

(72) Inventors: Konrad Buettner, Schweinfurt (DE); Ignacio Lobo Casanova, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 372 days.

(21) Appl. No.: 17/438,608

(22) PCT Filed: Mar. 12, 2020

(86) PCT No.: PCT/EP2020/056675
§ 371 (c)(1),
(2) Date: Sep. 13, 2021

(87) PCT Pub. No.: WO2020/182948
PCT Pub. Date: Sep. 17, 2020

(65) Prior Publication Data
US 2022/0143936 A1    May 12, 2022

(30) Foreign Application Priority Data
Mar. 13, 2019  (DE) .................. 102019203383.0

(51) Int. Cl.
*B29C 70/54*    (2006.01)
*B26D 7/08*    (2006.01)
(Continued)

(52) U.S. Cl.
CPC ............ *B29C 70/465* (2013.01); *B26D 7/086* (2013.01); *B29B 11/16* (2013.01); *B29C 70/545* (2013.01); *B29K 2105/256* (2013.01)

(58) Field of Classification Search
CPC ........ B29C 70/545; B29B 11/16; B26D 7/086
(Continued)

(56) References Cited

U.S. PATENT DOCUMENTS

2016/0368729 A1  12/2016  Ufer
2018/0250893 A1   9/2018  Kuroda
(Continued)

FOREIGN PATENT DOCUMENTS

DE  19902827 C1  6/2000
DE  10315043 A1  5/2004
(Continued)

OTHER PUBLICATIONS

International Search Report and Written Opinion for PCT/EP2020/056675 dated Jul. 3, 2020 (13 pages; with English translation).
(Continued)

*Primary Examiner* — Robert B Davis
(74) *Attorney, Agent, or Firm* — Kristin L. Murphy (57) ABSTRACT

The disclosure relates to a method for producing a fiber preform, wherein: at least one dry and textile fiber material is provided; the fiber material is assembled into a plurality of individual layers; the plurality of individual layers is provided with a binder; the plurality of individual layers is layered to form a package; and a plurality of interconnected fiber preforms is formed by pressing the package. A separation of the plurality of interconnected fiber preforms and activation of the binder occur in a common process step. The disclosure furthermore relates to a corresponding system.

20 Claims, 3 Drawing Sheets

(51) Int. Cl.
    *B29B 11/16*     (2006.01)
    *B29C 70/46*     (2006.01)
    *B29K 105/00*     (2006.01)

(58) Field of Classification Search
    USPC .............................................. 156/73.1, 251
    See application file for complete search history.

(56) References Cited

U.S. PATENT DOCUMENTS

| | | | |
|---|---|---|---|
| 2019/0134854 A1* | 5/2019 | Kuroda | B29C 70/546 |
| 2021/0237301 A1* | 8/2021 | Krajca | B29C 70/545 |
| 2021/0299983 A1* | 9/2021 | Kawano | B29C 43/20 |
| 2022/0194029 A1* | 6/2022 | Seegel | B26D 7/10 |

FOREIGN PATENT DOCUMENTS

| | | |
|---|---|---|
| DE | 10353070 A1 | 6/2005 |
| DE | 102011102950 A1 | 2/2012 |
| DE | 102015116837 A1 | 4/2017 |
| DE | 202016104843 U1 | 12/2017 |
| WO | 9418373 A1 | 8/1994 |

OTHER PUBLICATIONS

Frank Michael Weiland et al: "Ultraschall-Preformmontage zur Herstellung von CFK-Luftfahrtstrukturen," Jun. 22, 2012 (Jun. 22, 2012), figures 4.2, 6.5, chapter 3.4.2-3.4.4, chapter 4.1; p. 28, chapter 6.1; p. 44, chapter 8.4.

* cited by examiner

METHOD AND SYSTEM FOR PRODUCING A FIBER PREFORM

CROSS-REFERENCE TO RELATED APPLICATIONS

This application is a national stage of International Application No. PCT/EP2020/056675, filed Mar. 12, 2020, the disclosure of which is incorporated herein by reference in its entirety, and which claimed priority to German Patent Application No. 102019203383.0, filed Mar. 13, 2019, the disclosure of which is incorporated herein by reference in its entirety.

TECHNICAL FIELD

The present disclosure relates to a process for production of a fiber preform, and to a system for the production of a fiber preform.

BACKGROUND

The prior art discloses the use of fiber composite materials in many technical fields. For example, carbon-fiber-reinforced plastics are frequently used in aerospace technology, and also in sports equipment. Glass fibers or aramid fibers are likewise also known to be used for reinforcement of materials. In such cases, fiber-reinforced components are usually produced from dry or preimpregnated semifinished fiber products. When dry semifinished fiber products are used, these semifinished fiber products are generally first used to produce a fiber preform, i.e. a dry fiber compound, which already anticipates, at least in broad terms, the subsequent shape of the component. The dry semifinished fiber products are typically dimensioned in the form of upstream textile products, for example woven fabrics or laid scrims, and are then converted to the desired shape, i.e. the shape of the fiber preform, by reorientation and reshaping of the fiber construct. The fixing of the fiber preforms can, by way of example, be achieved with the aid of a binder system. The binder systems used are mostly thermoset or thermoplastic substances, which, by way of example, are applied in powder form and in relatively small quantity, for example in the range of two to five percent by weight, to the semifinished fiber product, and are activated with exposure to heat or by a temperature increase. The fiber preforms thus fixed can then, for example, be separated by suitable cutting implements. Finally, the fiber-reinforced components are finished by saturation in a matrix material or by injection of the matrix material, for example resin, followed by drying.

In this connection, DE 10 2015 116 837 A1 describes an activation device for binder activation during the production of a fiber-reinforced plastics laminate. The activation device comprises at least one light-emitting diode, which illuminates and heats a section of the semifinished fiber product, in order to activate the binder present therein.

DE 103 53 070 A1 discloses a device for binder activation on a semifinished fiber product via indirect heating of carbon fibers by applying an electrical voltage. To this end, the device comprises a fiber-preform-shaping device for the shaping of a fiber preform made of a dry semifinished fiber product comprising carbon fibers. There are at least two electrodes integrated into, or arranged on, the fiber-preform-shaping device, in order to apply an electrical voltage to at least one portion of the carbon fibers of the fiber preform. It is thus possible to activate the binder in a comparatively short period of time, thus in turn reducing the overall time for the production process.

However, the known processes and devices for the production of fiber-reinforced components have disadvantages. More specifically, one disadvantage is that the known processes are comparatively time-consuming because of the large number of sequential process steps required. Comparatively, high capital expenditure is required for the purchase of a large number of workstations required to carry out the process steps.

What is needed, is an improved process for the production of a fiber preform.

SUMMARY

A process for the production of a fiber preform is disclosed herein.

The disclosure provides a process for the production of a fiber preform, where at least one dry and textile fiber material is provided, where the fiber material is dimensioned to give a plurality of individual layers, where a binder is provided to the plurality of individual layers, where the plurality of individual layers is layered to give a package, and where a plurality of interconnected fiber preforms is formed by pressing of the package. The process of the disclosure is distinctive in that a separation of the plurality of interconnected fiber preforms and an activation of the binder are achieved together in a single process step.

The disclosure therefore describes a process in which a fiber preform is produced from textile fiber material in a series of process steps. The starting point of this disclosure is what is known as a "sequential production process". The fiber preform is also known as "preform" in the prior art, and is a premolding which can be subjected to final processing to give a fiber-reinforced component in the course of process steps with a matrix material, e.g. a resin, which are subsequent to the process of the disclosure. To this end, the fiber material is first usually at least approximately dimensioned, i.e. at least approximately cut to the desired subsequent shape of the fiber preforms or of the fiber-reinforced components, so that a plurality of individual layers of the fiber material is produced. Alternatively, it is also possible to fold the fiber material repeatedly into laps, and to delay cutting thereof to a subsequent process step or to omit cutting thereof entirely. For the purposes of the disclosure, the term "dimensioning" therefore means not only the cutting of the fiber material but also targeted folding or laying to give a certain shape. In a further step, a binder, which fulfils the function of an adhesive and typically comprises, a thermoset or thermoplastic substance, is provided to the plurality of individual layers of the fiber material. The provision of the binder to the plurality of individual layers can also be delayed to a subsequent process step, or equally can have already taken place before the dimensioning of the fiber material. Both possibilities may be equally applicable to the disclosure. Insofar as the individual layers have been dimensioned by cutting or by another division process, the individual layers are then layered or laid on top of one another so that a package is produced which comprises the plurality of individual layers arranged on top of one another. It is not essential that all of the individual layers have the same shape or that all of them are arranged precisely on top of one another. Instead, the shape of the respective individual layers, and the manner in which they are layered on top of one another, are such that in the form in which they are layered on top of one another, i.e. in the form of package, they approximate as closely as possible to the shape of the required fiber preforms. To this end, it can sometimes also be necessary to arrange some individual layers to some extent alongside one another. Insofar as the individual layers have been dimensioned by folding, the package for the purposes of the disclosure is usually produced directly during the folding of the individual layers. In a further step, the package is mechanically pressed into the shape of the plurality of interconnected fiber preforms, e.g. by a hydraulic press with correspondingly shaped press jaws. In a final step, the plurality of interconnected fiber preforms is finally separated, i.e. the fiber preforms are respectively released from the large number of connected fiber preforms, e.g. by a cutting process. At the same time, the binder is activated, so that the individual layers are bonded to one another by an adhesive action.

The disclosure therefore leads to an advantage of a compressed and shortened production process for the fiber preform. The shortened production process in turn permits increase of the number of units of the fiber preforms produced per unit of time, and thus leads to a cost advantage over known production processes. The number of workstations, which are mostly comparatively expensive to purchase, can moreover be reduced.

In one exemplary arrangement, it is provided that the plurality of interconnected fiber preforms is additionally shaped in said single process step by pressing of the package. The known production process can thus be even further shortened. It is moreover also possible to further reduce the costs for the purchase of the required workstations.

In another exemplary arrangement, it is provided that the fiber material comprises carbon fibers and/or glass fibers and/or aramid fibers. The fiber material here can be selected in accordance with the intended application and with required component properties, for example weight requirements, stiffness or elasticity. It is equally conceivable to combine two or more types of fiber materials, in order to achieve targeted adjustment to the desired component properties.

In another exemplary arrangement, it is provided that, before layering to give the package, the plurality of individual layers is oriented in respect of a fiber orientation of each individual layer. The orientation here can be identical for all of the individual layers, or else can be different in a targeted manner, for example offset by 90° for each individual layer. It is also equally possible, for example, to provide a successive layer-by-layer offset of, by way of example, in each case 10°. The fiber orientation, i.e. the orientation of the individual layers, has a substantial effect on the properties of the component, and this can therefore be altered and adjusted as required.

In one exemplary arrangement, the fiber orientation of a plurality of individual layers is oriented along a major direction of loading of the component. The component therefore has particular strength along its major direction of loading.

In another exemplary arrangement, it is provided that the activation of the binder is achieved by introduction of heat. This type of binder activation is particularly suitable for binders which comprise, or consist entirely of, thermoset or thermoplastic substances. Heat is moreover comparatively easy to generate, and can be introduced into the package or the individual layers in many different ways.

In one exemplary arrangement, it is provided that the heat is introduced by ultrasound and/or by conductive heat transfer. These possibilities for introduction of heat offer different advantages here and can have different levels of suitability, depending on the shape of, or material of, the fiber preform to be produced. An advantage of introduction of heat by ultrasound, i.e. by high-frequency mechanical waves, is by way of example that, by virtue of the comparatively low heat output, the introduction of heat can be achieved with good metering and uniform distribution. To this end, in one exemplary arrangement, an ultrasound source may be brought into contact with the material of the fiber preform, in order to ensure maximal effectiveness of introduction of the ultrasound into the material of the fiber preform. The introduction of heat is then achieved via exterior friction between the individual layers, and also via interior friction in intermolecular interfaces of adjacent individual layers. In contrast, the introduction of heat by a conductive heat transfer offers the advantage of introduction of large quantities of heat at rates which are comparatively very high.

In one exemplary arrangement, it is provided that the introduction of heat is achieved by ultrasound by way of at least one sonotrode, where the at least one sonotrode either is passed continuously across the plurality of interconnected fiber preforms or is applied at regular intervals to the plurality of interconnected fiber preforms. The result in the first case is a uniform activation of the binder that is introduced, whereas the result in the latter case is increased activation of the binder at the point where the sonotrode is applied. The latter case can in particular be advantageous when introduction of the binder is likewise nonuniform, preferably specifically only at the points where the sonotrode is applied.

In one exemplary arrangement, it is provided that the introduction of heat is achieved by conductive heat transfer by way of at least one contact roll, where the contact roll is heated and is passed across the plurality of interconnected fiber preforms. In one exemplary arrangement, the contact roll is electrically heatable, and has a comparatively high thermal conductivity, thus permitting the introduction of comparatively large quantities of heat into the package within a short time. In one exemplary arrangement, the contact roll is passed under a defined application pressure across the package, thus giving, by virtue of the application pressure, a further improvement in adhesive action of the binder between each pair of adjacent individual layers.

In another exemplary arrangement, it is provided that the separation of the plurality of interconnected fiber preforms is achieved by a cutting procedure, where the cutting procedure is achieved by way of a cutting implement, oscillation of which is induced by ultrasound. The excitation of the cutting implement by ultrasound here can be achieved continuously or with intervals, and in the case of excitation with intervals here the interval separations may be selected in a manner such that the cutting implement always exhibits ultrasound oscillation, i.e. therefore such that the interval separations are short and that therefore the ultrasound oscillation of the cutting implement never ceases completely during a cutting procedure. It has been found that application of ultrasound to the cutting implement can specifically provide a cutting procedure that, in comparative terms, is easier, faster and more precise. This is in particular advantageous in that the intention is to prevent exposure of the plurality of interconnected fiber preforms formed by pressing to any excessive application of force through the cutting procedure, in order to avoid disruption of the pressed shape. Otherwise, excessive frictional forces or adhesive forces could arise between a blade of the cutting implement and the individual layers, with the result that a cutting edge drags the individual layers away from their intended position within the package or within the plurality of interconnected fiber preforms. This would cause irreparable damage to the plurality of interconnected fiber preforms.

In one exemplary arrangement, the cutting implement is configured as blade. However, a scissor configuration or punch configuration is also conceivable.

As a general rule, the adhesive action between the plurality of individual layers is increased by the activation of the binder and the adhesive action thereof, thus making it in principle more difficult to extract individual layers from the pressed package. On the other hand, however, when the binder has been activated the cutting force required also increases, this being the force that has to be applied in order to separate the plurality of interconnected fiber preforms by a cutting procedure.

In one exemplary arrangement, it is provided that the oscillation takes place at frequencies between 20 kHz and 40 kHz. This exemplary range has proven to be a particularly suitable approach in industrial use.

In one exemplary arrangement, although the separation of the plurality of interconnected fiber preforms and an activation of the binder are achieved together in a single process step, they are achieved at different locations within the plurality of interconnected fiber preforms. By way of example, the contact roll for the introduction of heat and the blade for the cutting can be arranged on the same implement holder which is passed across the plurality of interconnected fiber preforms. While the introduction of heat is then achieved by way of the contact roll at one location within the plurality of interconnected fiber preforms, the separation of the plurality of interconnected fiber preforms by the blade is simultaneously achieved with a separation, prescribed by the implement holder, between the blade and the contact roll.

The disclosure moreover provides a system for the production of a fiber preform, comprising a first device, which is configured for dimensioning of dry and textile fiber material provided to give a plurality of individual layers, a second device, which is configured to provide a binder to the plurality of individual layers, and a third device, which is configured for the layering of a package made of the plurality of individual layers. The system of the disclosure is distinctive in that the system comprises a further device which is configured to implement a separation of the plurality of interconnected fiber preforms and an activation of the binder together in a single process step.

In one exemplary arrangement, the system also comprises a fourth device which is configured for the shaping of a plurality of interconnected fiber preforms by pressing of the package.

The system of the disclosure therefore comprises all of the devices that are required for the implementation of the process of the disclosure. This results in the abovementioned advantages.

In one exemplary arrangement, the first device is configured as cutting device or as punching device. Cutting devices or punching devices are advantageously suitable for the dimensioning of various textile fiber materials.

In one exemplary arrangement, the second device is preferably configured as scattering device which in particular can apply a binder present in powder form to the plurality of individual layers.

In one exemplary arrangement, the third device is configured as lay-up device which can grip, orientate and place the individual layers.

In the one exemplary arrangement the fourth device is configured as press, in particular as a hydraulic press. The hydraulic press may be heatable, in order to permit an activation of the binder simultaneously with the pressing of the package.

In one exemplary arrangement, it is provided that the further device is, additionally to the above, configured to shape a plurality of interconnected fiber preforms by pressing of the package. In this case it is advantageously possible to omit the purchase and provision of the fourth device.

In one exemplary arrangement, it is provided that the further device comprises a cutting implement which can receive ultrasound and a sonotrode, where the cutting implement that can receive the ultrasound and the sonotrode are fixedly arranged on the same implement holder. This has the resultant advantage that the separation of the plurality of interconnected fiber preforms and the activation of the binder can be implemented in very simple manner together in a single process step because, on the same holder, they can also be passed together across the plurality of interconnected fiber preforms. The separation and the activation are therefore achieved simultaneously and together in a single process step, but at different locations within the plurality of interconnected fiber preforms. These different locations are determined here by the implement holder, which prescribes the separation between the cutting implement arranged thereon and the sonotrode likewise arranged thereon.

The cutting implement which can receive ultrasound may be configured as blade which can receive ultrasound.

In one exemplary arrangement, it is provided that the cutting implement that can receive ultrasound and the sonotrode both receive ultrasound from the same ultrasound source. This has the resultant advantage that only one shared ultrasound source has to be provided, which then applies ultrasound to the cutting implement and the sonotrode in the same manner. The capital expenditure for the further device can thus be reduced.

In one exemplary arrangement, it is provided that the further device comprises a cutting implement which can receive ultrasound and a heatable contact roll, where the cutting implement which receives ultrasound and the heatable contact roll are fixedly arranged on the same implement holder. This arrangement is an alternative to the provision of the cutting implement in combination with the sonotrode on the same implement holder.

In one exemplary arrangement, it is provided that the contact roll is electrically heatable. This has the resultant advantage that the heat is generated directly in the contact roll and heat losses due to any possible supply line can be avoided. Comparatively precise regulation of the heat generation is moreover possible.

Alternatively, the contact roll can also be heatable by way of a liquid medium, for example water or oil. In this case, a suitable supply line is provided which can supply the liquid medium to the contact roll. A suitable discharge line is likewise provided.

In another exemplary arrangement, it is provided that the system is configured to implement the process of the disclosure.

BRIEF DESCRIPTION OF THE DRAWINGS

The disclosure is explained by way of example below with reference to various exemplary arrangements depicted in the figures.

Identical items and functional units, and comparable components, are designated with identical reference signs in all of the figures. These items and functional units, and comparable components, are designed identically in respect of their technical features unless the description explicitly or implicitly indicates otherwise.

DETAILED DESCRIPTION

Figure 1A:
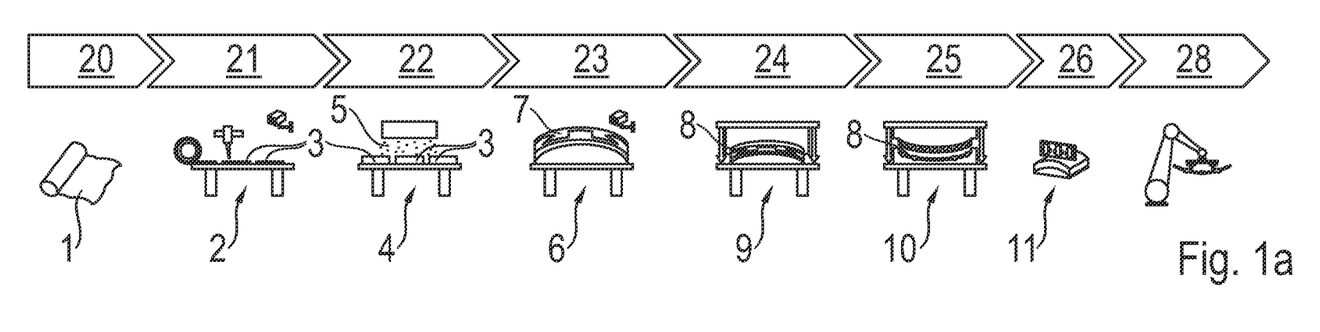
FIG. 1 shows by way of example and diagrammatically a sequence of a process of the disclosure in comparison with a process known in the prior art.
Figure 1B:
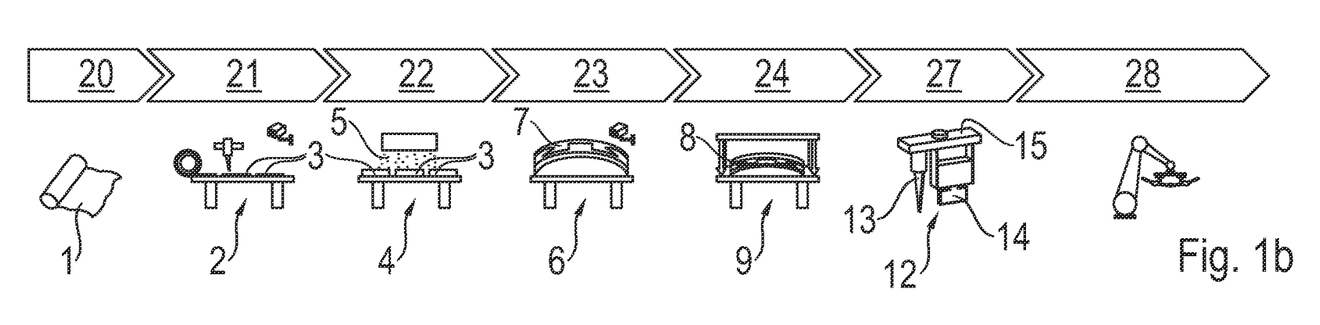

FIG. 1 shows by way of example and diagrammatically a sequence of a process of the disclosure (FIG. 1b) in comparison with a process known in the prior art (FIG. 1a). Not only in the process of the disclosure but also in the known process, a dry and textile fiber material 1 is first provided in a first process step 20. The fiber material 1 in the example is configured as carbon fiber material 1, and is introduced into a first device 2, which in the example is configured as cutting device 2. In process step 21, the fiber material 1 is dimensioned by the cutting device 2 to give a plurality of individual layers 3 of the fiber material 1. The individual layers 3 in the example are all configured with identical shape. In the following process step 22, a binder 5 comprising a thermoplastic substance is provided to the plurality of individual layers 3 by a second device 4. To this end, the second device 4 is configured in the example as scattering device 4 which applies the binder 5 in powder form to the plurality of individual layers 3. In step 23, the plurality of individual layers 3 is now layered to give a package 7, while consideration is given to a fiber orientation of each individual layer. The package 7 therefore includes the plurality of individual layers 3. The layering of the plurality of individual layers 3 to create the package 7 is achieved by a third device 6, which is configured in the example as lay-up device 6, and which can grip, orientate and place the plurality of individual layers 3. Up to process step 23 there is no difference in the example between the known process and the process of the disclosure.

In step 24 in the known process, a plurality of interconnected fiber preforms 8 is now formed by pressing of the package 7, where the pressing is achieved in the example by a fourth device 9 configured as hydraulic press 9. In step 25 in the known process, the binder 5 is activated by a contact heating system 10, so that the binder 5 develops an adhesive action between the individual layers 3 of the package 7 and, respectively, of the plurality of interconnected fiber preforms 8. In process step 26, the plurality of interconnected fiber preforms 8 is then separated by a punching device 11. In step 28, the separated fiber preforms 8 are transferred to another device not depicted in FIG. 1 for their further processing.

The process of the disclosure differs from the known process steps 24, 25 and 26 in that process step 27 simultaneously achieves formation of the plurality of interconnected fiber preforms 8, the activation of the binder 5 and, likewise simultaneously, the separation of the plurality of interconnected fiber preforms 8. The further device 12 here in the example comprises a cutting implement 13 which can receive ultrasound, and a sonotrode 14, where the cutting implement 13 which can receive ultrasound, and the sonotrode 14, are fixedly arranged on a single implement holder 15. Because the shaping procedure, the separation of the plurality of interconnected fiber preforms 8 and the activation of the binder 5 are achieved simultaneously, it is possible to achieve, in comparison with the known process, a reduction of the required production time. The capital expenditure necessary can moreover be reduced, because purchase of the separate components of the hydraulic press 9, of the contact heating system 10, and also of the punching device 11, can be omitted. Instead, it is merely necessary to purchase the further device 12. In step 28, here again the separated fiber preforms 8 are transferred to another device for their further processing.

Figure 2:
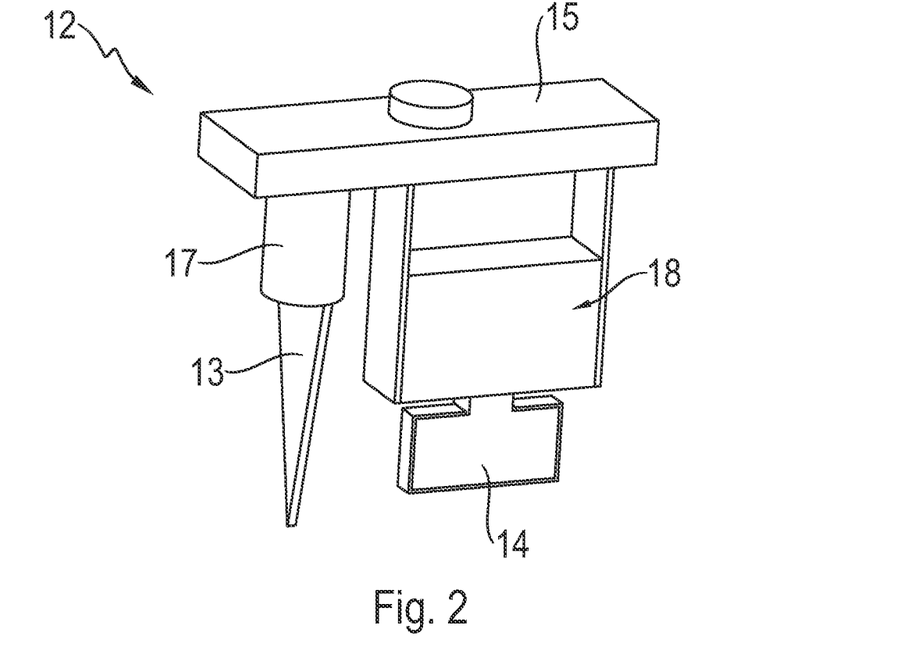
FIG. 2 shows by way of example and diagrammatically a possible exemplary arrangement of a device which is configured to implement separation of a plurality of interconnected fiber preforms and to implement activation of a binder in a single process step.

FIG. 2 shows by way of example and diagrammatically a possible arrangement of the device 12, which is configured to implement the separation of the plurality of interconnected fiber preforms 8 and the activation of the binder 5 in a single process step. To this end, the further device 12 shown by way of example in FIG. 2 comprises a cutting implement 13 which can receive ultrasound, configured as blade 13, and also comprises a sonotrode 14, these being fixedly arranged with a prescribed separation on a single implement holder 15. By the blade 13, the plurality of interconnected fiber preforms 8 can be cut and thus separated. At the same time, ultrasound waves are introduced by way of the sonotrode 14 into the plurality of interconnected fiber preforms 8, and these activate the binder 5, which thus develops its adhesive action. The application of ultrasound to the blade 13 permits comparatively easy and precise cutting of the fiber material 1 of the plurality of interconnected fiber preforms 8. In order to generate the ultrasound waves, there is an ultrasound source 17 allocated to the blade 13, and an ultrasound source 18 allocated to the sonotrode 14. As a result of the depicted separation of the blade 13 from the sonotrode 14, although the separation and the activation are achieved simultaneously, they are achieved at different locations within the plurality of interconnected fiber preforms 8. It is thus possible to determine, via the orientation of the further device 12, whether an individual fiber preform 8 is to be first divided off or cut off or separated by the blade 13 from the plurality of interconnected fiber preforms 8 or whether the binder 5 is first to be activated in the region of the individual fiber preform 8 by the sonotrode 14. The single implement holder 15 in the example can be linked to an industrial robot, not depicted, or to a CNC milling machine, likewise not depicted; said robot or said machine then, during the course of implementation of the process of the disclosure, guides and activates the further implement 12 across the plurality of interconnected fiber preforms 8.

Figure 3:
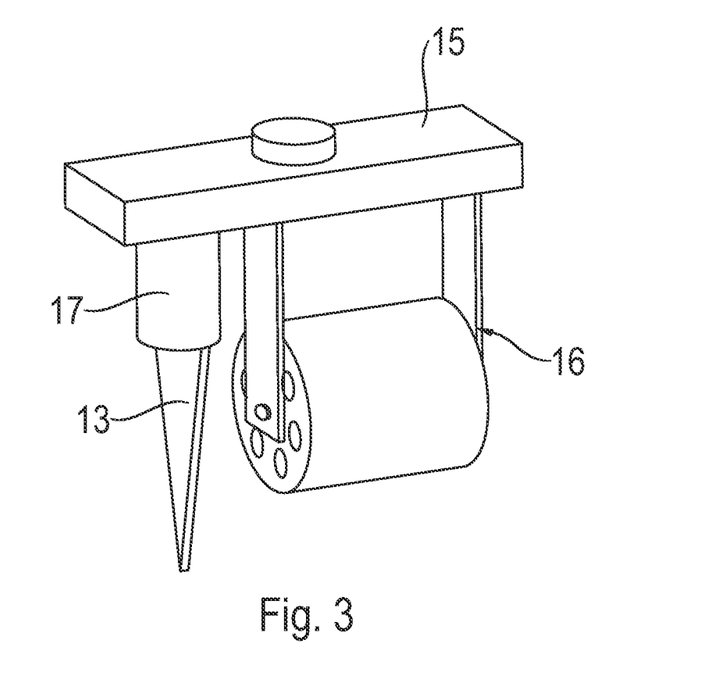
FIG. 3 shows by way of example and diagrammatically another possible exemplary arrangement of a device which is configured to implement separation of a plurality of interconnected fiber preforms and to implement activation of the binder in a single process step.

FIG. 3 shows by way of example and diagrammatically another possible exemplary arrangement of the device 12, which is configured to implement the separation of the plurality of interconnected fiber preforms 8 and the activation of the binder 5 in a single process step. The device 12 of FIG. 3 differs from the device 12 of FIG. 2 in that it comprises an electrically heatable contact roll 16 instead of the sonotrode 14. The heatable contact roll 16 is likewise fixedly arranged with the blade 13 on the single implement holder 15.

Figure 4:
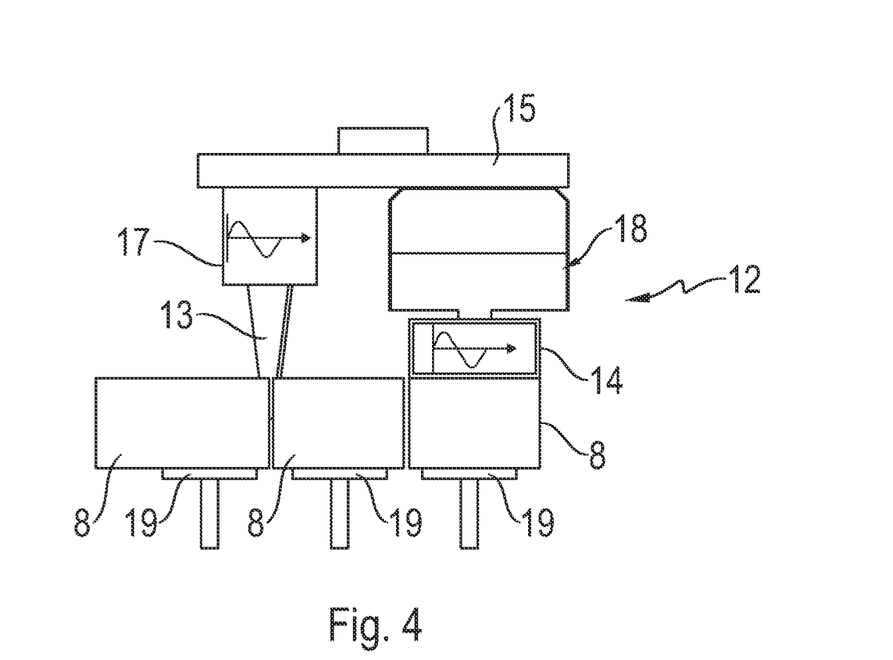
FIG. 4 shows by way of example and diagrammatically the arrangement depicted in FIG. 2 of the device during an implementation of the process of the disclosure and FIG. 5 likewise shows by way of example and diagrammatically the arrangement depicted in FIG. 2 of the device during implementation of the process of the disclosure.

FIG. 4 shows by way of example and diagrammatically the exemplary arrangement already depicted in FIG. 2 of the device 12 during the implementation of the process of the disclosure. The device 12 comprises a cutting implement 13 which can receive ultrasound, configured as blade 13, with an ultrasound source 17, and comprises a sonotrode 14 with an ultrasound source 18, these being fixedly arranged with a prescribed separation on a single implement holder 15. The single implement holder 15 in the example is passed by an industrial robot, which is not depicted, across a plurality of interconnected fiber preforms 8. The plurality of interconnected fiber preforms 8 has been placed on holders 19. As can be seen, the device 12 in FIG. 4 is oriented in a manner such that a fiber preform 8 is first divided off or cut off or separated by the blade 13 from the plurality of interconnected fiber preforms 8 before ultrasound is applied thereto by the sonotrode 14, this then leading to the activation of the binder 5. The effect of this is therefore that although in the depiction of FIG. 4 the separation and activation are achieved simultaneously in a single process step, by virtue of the separation of the blade 13 from the sonotrode 14 they are achieved at separate locations, such that the fiber preforms 8 are separated before the binder 5 of the separated fiber preforms 8 is activated.

Figure 5:
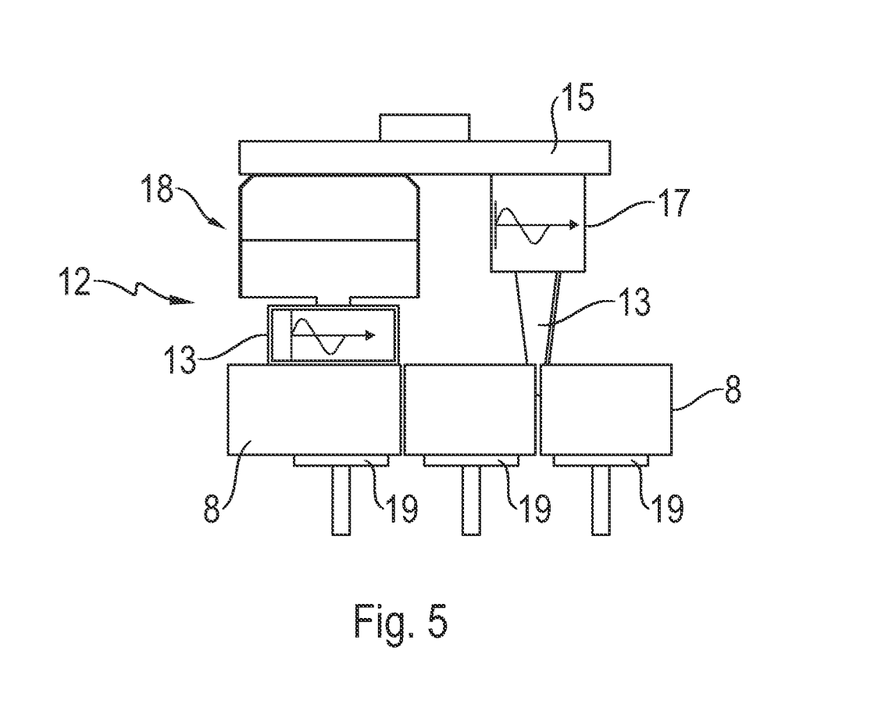

FIG. 5 likewise shows by way of example and diagrammatically the arrangement depicted in FIG. 2 of the device 12 during the implementation of the process of the disclosure. The depiction of FIG. 5 differs from the depiction of FIG. 4 via the orientation of the device 12: in FIG. 5, the orientation of the device 12 is specifically such that ultrasound is first applied to the plurality of interconnected fiber preforms 8 by the sonotrode 14, so that activation of the binder 5 is therefore achieved before the plurality of interconnected fiber preforms 8 is separated by the blade 13. In this case again, although the separation and activation are achieved simultaneously in a single process step, by virtue of the separation of the blade 13 from the sonotrode 14 they are achieved at separate locations, such that the binder 5 is activated before the fiber preforms 8 are separated.

What is claimed is:

1. A process for the production of a fiber preform, comprising: providing at least one dry and textile fiber material, wherein the fiber material is dimensioned to have a plurality of individual layers, providing a binder to the plurality of individual layers, wherein the plurality of individual layers is layered to form a package, and where a plurality of interconnected fiber preforms is formed by pressing of the package, wherein a separation of the plurality of interconnected fiber preforms and an activation of the binder are achieved together in a single process step.

2. The process as claimed in claim 1, wherein additionally in the single process step, the plurality of interconnected fiber preforms is formed by pressing of the package.

3. The process as claimed in claim 1, wherein the fiber material comprises carbon fibers and/or glass fibers and/or aramid fibers.

4. The process as claimed in claim 1, wherein before layering to form the package, the plurality of individual layers is oriented in respect of a fiber orientation of each individual layer.

5. The process as claimed in claim 1, wherein the activation of the binder is achieved by introduction of heat.

6. The process as claimed in claim 5, wherein the introduction of heat is achieved by ultrasound and/or by conductive heat transfer.

7. The process as claimed in claim 6, wherein the introduction of heat is achieved by ultrasound by way of operation of at least one sonotrode, where the at least one sonotrode is passed continuously across the plurality of interconnected fiber preforms.

8. The process as claimed in claim 6, wherein the introduction of heat is achieved by conductive heat transfer by way of at least one contact roll, where the contact roll is heated and is passed across the plurality of interconnected fiber preforms.

9. The process as claimed in claim 1 wherein the separation of the plurality of interconnected fiber preforms is achieved by a cutting procedure, wherein the cutting procedure is achieved by way of a cutting implement, oscillation of which is induced by ultrasound.

10. The process as claimed in claim 9, wherein the oscillation takes place at frequencies in the range of between 20 kHz and 40 kHz.

11. A system for the production of a fiber preform, comprising a first device, which is configured for dimensioning of dry and textile fiber material provided to give a plurality of individual layers, a second device, which is configured to provide a binder to the plurality of individual layers, and a third device, which is configured for layering of a package made of the plurality of individual layers, wherein the system comprises a further device that is configured to implement a separation of the plurality of interconnected fiber preforms and an activation of the binder together in a single process step.

12. The system as claimed in claim 11, wherein the further device is also configured to form a plurality of interconnected fiber preforms by pressing the package.

13. The system as claimed in claim 11 wherein the further device comprises a cutting implement which can receive ultrasound, and a sonotrode, where the cutting implement which can receive ultrasound, and the sonotrode are fixedly arranged on the same implement holder.

14. The system as claimed in claim 13, wherein the cutting implement which can receive ultrasound and the sonotrode receive ultrasound from the same ultrasound source.

15. The system as claimed in claim 11 wherein the further device comprises a cutting implement which can receive ultrasound, and a heatable contact roll, wherein the cutting implement which can receive ultrasound, and the heatable contact roll are fixedly arranged on the same implement holder.

16. The system as claimed in claim 15, wherein the contact roll is electrically heatable.

17. The process as claimed in claim 6, wherein the introduction of heat is achieved by ultrasound by way of operation of at least one sonotrode, where the at least one sonotrode is applied at regular intervals to the plurality of interconnected fiber preforms.

18. The system as claimed in claim 11, wherein the further device comprises a cutting implement that receives ultrasound, the cutting implement having a first ultrasound source and comprising a sontrode with a second ultrasound source.

19. The system as claimed in claim 18, wherein the cutting implement is separated from the sonotrode on a common implement holder by a predetermined distance.

20. The system as claimed in claim 19, wherein the system has a flowpath for the production of the fiber preforms, and the cutting implement is arranged in the flowpath of the system such that the cutting implement is utilized before the sonotrode.

* * * * *